W. Pearce,
Bread Machine,

№ 79,680.          Patented July 7, 1868.

Witnesses.
Jno Alfred Ellis
J. W. O'Kister

Inventor
W. Pearce
per J. H. Alexander
Atty.

United States Patent Office.

WESLEY PEARCE, OF McLEAN COUNTY, ILLINOIS.

Letters Patent No. 79,680, dated July 7, 1868.

IMPROVED SPONGE AND DOUGH-RAISER.

*The Schedule referred to in these Letters Patent and making part of the same.*

TO ALL WHOM IT MAY CONCERN:

Be it known that I, WESLEY PEARCE, of McLean county, and State of Illinois, have invented a new and improved Mode of Raising Bread-Sponge and Raising Dough after it has been kneaded; and I do hereby declare that the following is a full and exact description thereof, reference being had to the accompanying drawings and to the letters of reference marked thereon, in which—

Figure 1:
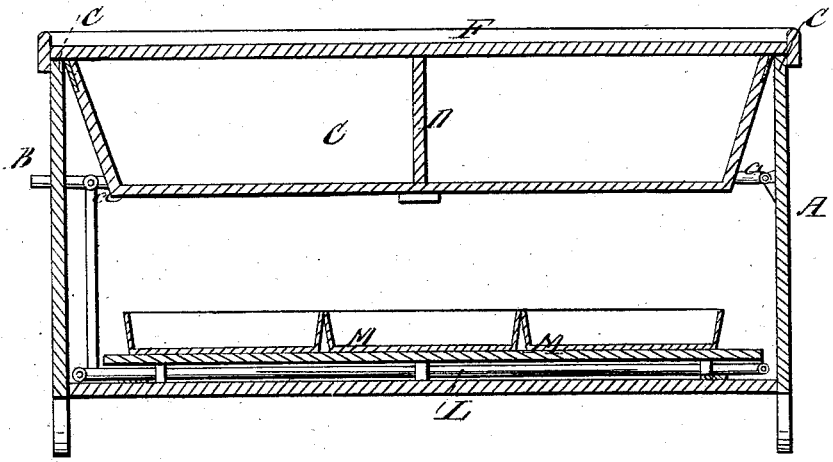
Figure 2:
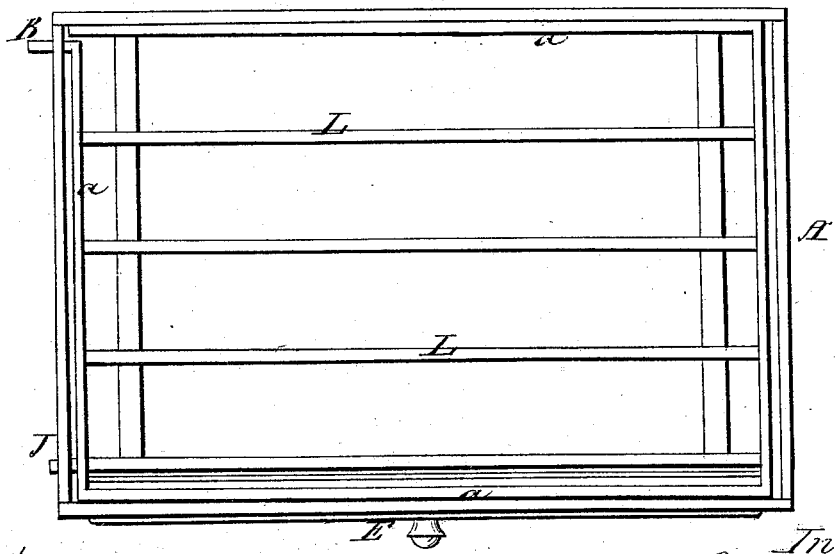

Figure 1 represents a central sectional view of my bread-sponge and dough-raiser, and Figure 2 a plan view, showing the pipe arrangement with the other parts of the machine removed.

The nature of my invention consists in the employment of coils of non-corrosive pipe, placed under and around the sponge-trough, into which steam is introduced for heating the sponge, and also for heating, in the same manner, the dough, when placed in the bread-pans in the proof-box, substantially in the manner herein-after set forth.

To enable others to make and use my invention, I will now describe its construction and operation.

In the accompanying drawings, A designates a rectangular box, of any desired size, which is provided with a cover, F. This cover is made so that it will fit down tightly on the box, in order to prevent the escape of heat, and may be also used as a mould-board.

C represents the sponge-trough, which is bevelled or inclined from its top to its bottom, and made to rest in box A, having its upper surface flush with that of the box, and fitting closely therein, the object of which will be apparent hereafter.

The trough C is provided with projections or metal plates $c\ c$, which act as supports for holding the trough in the box, and also as handles for removing the trough.

$a$ designates a set or system of pipes situated around and secured to the inner sides of the box A, directly opposite the lower part of the trough C, the trough being bevelled or inclined, as above described, to allow the pipes space to pass, and being sufficiently far from the trough to prevent the dough from being heated too rapidly. These pipes are connected with another series or system of pipes, L L, placed in the bottom of the box; (see fig. 1.)

The pipes L L are jointed together by means of lateral pipes, placed at the ends of the pipes L L, alternately, thus heating the entire bottom-surface of the trough.

The pipes $a$ are furnished with an opening at the point B, by means of which the steam is introduced into the pipes $a$ and L, the two being connected, as already described, and pipes L being likewise provided with an opening or outlet, for the discharge of the condensed steam, at the point J.

E represents the door, hinged to the lower part of the box.

M designates a shield or board, placed over the bottom pipes, L, and held in place over the pipes by means of notched cross-pieces attached to its bottom. The object of this board is to prevent the pans, placed on the board, from being exposed to an excessive heat, and also to disseminate it.

The space between the under side of the trough C and the upper surface of the shield or board M, I term the proof-chamber or box.

The operation of my machine is as follows: Mix the sponge properly in one end of the trough C, separating it from the flour by a partition or board, D. Place the cover F on the box, then let the steam into the pipes at B, and raise the heat to about 100° Fahrenheit. When the sponge has properly risen, mix a suitable quantity with it. Knead it thoroughly, and put it into the pans in the proof-chamber, which rest on the shield M, and return the cover F to its place. Close the door E, and let on the steam again until the heat is about 100°, at which degree it should be kept till the dough has thoroughly risen, when the pans should be removed to the oven.

By means of this process, less than one-half of the usual time is required to make bread, and it is equally good, if not better, than when made by processes heretofore employed.

The introduction of heat by steam in pipes, as described, has great advantages over that unconfined in pipes under the sponge-trough and bread-pans—a mode heretofore practised by me. Unconfined steam in a short time warps and destroys the sponge-trough, and the box in which it is situated, and the former will soon become sour if not kept in constant use.

I do not claim the introduction of unconfined steam between a sponge and outer box, such a method having heretofore been used, and being attended with disadvantages which are obviated by the use of my invention; but What I do claim, and desire to secure by Letters Patent, is—

The introduction of steam, in coils of pipe, between a sponge-trough and outer-box, for the purpose of raising the sponge and dough before baking, substantially as described.

WESLEY PEARCE.

Witnesses:
    O. N. WARD,
    AARON MAYERS.